Patented Apr. 18, 1933

1,904,830

UNITED STATES PATENT OFFICE

HANS KAFFER, OF DUISBURG-MEIDERICH, GERMANY

PROCESS FOR THE PRODUCTION OF MOTOR DRIVING SPIRITS

No Drawing. Application filed March 27, 1930, Serial No. 439,537, and in Germany October 29, 1926.

The gas or tar benzines produced by the low temperature distillation of mineral coal and which boil up to about 200° C. can be converted according to the known processes into useful motor spirits containing no resinifying constituents only with difficulty and with great loss. Their content of unsaturated hydrocarbons, which have a detrimental effect in the motor, usually exceeds a quantity of 30% and since according to the usual processes of the art these can only be removed by conversion into almost worthless resins and polymerization products, the necessary purification for motor operation purposes becomes uneconomical in the highest degree.

It has now been found that motor spirits of great stability as regards resinifying influences and having an extremely small content of unsaturated compounds can be obtained from the crude benzine of low temperature mineral coal distillation if a reduction process is first of all carried out in which such a crude benzine is heated under high hydrogen pressure in presence of catalytically acting active carbon to temperatures above 300°. The unsaturated constituents of the crude benzine take up hydrogen and pass over into saturated hydrocarbons which are advantageously suited for motor operation purposes, without there being any perceptible loss of the initial material owing to polymerization or cracking.

The present invention is fundamentally differentiated from the known process of reducing hydrocarbons in presence of a metallic contact body, such as for example nickel, or under high hydrogen pressure and high temperature in the manner of the Bergius process, by this, that a careful preliminary purification of the crude benzine, particularly desulphurization which is necessary in contact hydrogenation, is unnecessary, and that in consequence of the use of comparatively low temperatures there is no splitting up and no formation of smaller molecules, such as occurs in the Bergius process and similar processes.

The use of active carbon has already been mentioned in British Specification No. 247,587; lignite coal tar is treated in presence of nitrogen compounds such as ammonia, with hydrogen under high pressure and at high temperature, the reaction vessel being filled with catalytically acting or indifferent substances, amongst other materials activated carbon being also mentioned as such a material. Since the catalytically acting and indifferent substances are mentioned beside one another there is no doubt that no value is attached to the role of the activated carbon as a catalyst in the published process, that on the contrary the nitrogen compounds are to serve as catalysts, while the activated carbon appears as a contact carrier, wherefor in the published process it is particularly suited as a gas absorbing medium.

The above described process is also fundamentally differentiated from the subject of the present application by the fact that it does not consist in a true hydrogenation characterized by the addition of hydrogen, but in a splitting up of the initial materials in conjunction with this, with the formation of hydrocarbons which boil lower than these latter materials.

Further, the use of active carbon has been disclosed in British Specification No. 205,868 in connection with the purification of crack benzine, treatment in the presence of hydrogen being also dealt with, which treatment, however, is represented as being just as unimportant as the treatment under pressure.

Further, the object of the process described in this prior specification is that the unsaturated and resinifying compounds are to be condensed or polymerized by the treatment in presence of active carbon, which cannot come into question at all with the present process since, owing to the high percentage of unsaturated compounds in the initial material, the process would be absolutely uneconomical; on the contrary in the present process the active carbon merely serves as a hydrogenating catalyst.

*Example.*—500 kg. of a crude benzine obtained by the low temperature coking of long flaming gas coal, which benzine passes over from about 87–192° C., are heated for about 3 hours to a temperature of 345–350° C. in a high pressure autoclave with addition of 100 kg. of finely ground active carbon and in hydrogen under a pressure of 110 atmospheres; the pressure first rises to about 250 atmospheres but in the course of the process it falls again to about 228 atmospheres. The contents of the autoclave, when they are cooled down, are steam blown, whereby a colorless distillate is obtained in almost quantitative yield, which only slightly colors yellow on shaking with sulphuric acid, and consequently may be considered as practically free from unsaturated compounds. The conversion of all unsaturated hydrocarbons into saturated hydrocarbons may also be concluded from the specific gravity which, before the hydrogenation, is 0.825 and after the hydrogenation 0.808.

The following comparative figures prove that no splitting up of the initial material has taken place.

*Boiling points of distillation benzines before and after hydrogenation*

| Initial material:—Low temperature tar benzine | | Hydrogenated reaction product | |
|---|---|---|---|
| Degrees | Per cent | Degrees | Per cent |
| 87–113 C. | 10 | 89–117 C. | 10 |
| 87–130 | 26 | 89–126 | 20 |
| 87–148 | 50 | 89–149 | 50 |
| 87–165 | 70 | 89–165 | 70 |
| 87–192 | 90 | 89–197 | 90 |

Since no precise statements can be found in the literature with regard to the composition of these benzines obtained by the low temperature coking of mineral coal, this result of the experiments was not to be foreseen.

The distillation benzine from the low temperature distillation of lignite coal is converted into valuable motor driving spirits practically free from unsaturated and resinifying compounds in a manner completely analogous to the action of hydrogen on benzine from the low temperature coking of mineral coal, without there being any cracking, that is formation of smaller split-off portions and without it being necessary previously to free the crude material from contact poisons.

*Example.*—350 kg. of a crude benzine obtained by the low temperature distillation of lignite coal generator tar, freed in the usual manner from its phenols and bases, which boiled at about from 140–230° C. had a specific gravity of 0.8452 and reacted with strong sulphuric acid with generation of much heat and production of brown color were heated for 2½ hours to 340–350° C. with 100 kg. of active carbon and after compressing the hydrogen to an initial pressure of 110 atm. at normal temperature. After cooling, the pressure still amounted to 100 atm. The benzine withdrawn from the reaction bomb in almost quantitative yield now showed a specific gravity of 0.820, had a practically unchanged boiling point, and on shaking with concentrated sulphuric acid became only faintly brownish yellow colored.

The comparison of the boiling points of the crude lignite coal benzine (obtained by the low temperature distillation of lignite coal) and of the hydrogenated benzine shows that no cracking has taken place.

| Crude | Hydrogenated |
|---|---|
| 134.3–144° C.= 5% | 123–128° C. = 5% |
| 134.3–150.3 =10% | 123–146.3 =10% |
| 134.3–159.4 =20% | 123–154.8 =20% |
| 134.3–167.1 =30% | 123–162.6 =30% |
| 134.3–177.7 =40% | 123–171.3 =40% |
| 134.3–181.7 =50% | 123–178.4 =50% |
| 134.3–188 =60% | 123–188.5 =60% |
| 134.3–198.3 =70% | 123–198.2 =70% |
| 134.3–209.8 =80% | 123–208.1 =80% |
| 134.3–219 =85% | 123–218.6 =85% |
| 134.3–226.2 =90% | 123–230 =90% |

It has further been found that the process may be successfully extended to the crude benzenes produced in the high temperature coking of mineral coal. These contain, particularly in their fractions boiling at about 130–200° C. large quantities of unsaturated compounds, such as styrene, cumarone, indene and their homologues, the presence of which is very detrimental to the use of these benzenes particularly for motor operation purposes. The purification of sulphuric acid carried out in the usual manner is extraordinarily wasteful, since it converts the said compounds into almost worthless resins or polymerized products.

If on the other hand such crude benzenes obtained by high temperature coking of mineral coal are treated according to the process with hydrogen under high pressure and at high temperatures in the presence of active carbon, their unsaturated constituents pass almost completely without residue into saturated hydrocarbons and other compounds which in a similar manner as the hydrocarbons of pure aromatic character contained therein are advantageously suited for motor operation purposes. Only a very small fraction of the unsaturated hydrocarbons is hereby converted, probably by heat polymerization into a resin remaining as a residue on distillation.

No cracking of the hydrocarbons used or produced takes place.

*Example.*—A crude solvent naphtha obtained from high temperature coke oven tar and freed from phenols and bases, having a boiling point of from 181–196.5° C. and a specific gravity of 0.932, which reacts with sulphuric acid with the generation of much heat and considerable resinification, is mixed with a third of its weight with finely ground active carbon and heated from 345–350° C. for 2½ hours in high pressure apparatus after the introduction of hydrogen at a pressure of 110 atmospheres. After cooling the pressure of the hydrogen is lowered about 15 atmospheres to 95 atmospheres. It is once again raised to 110 atmospheres after which the contents of the autoclave are heated again in the same manner and to the same temperature. After the completion of this second heating operation there is a final pressure of 100 atmospheres. The steam distillation of the contents of the autoclave obtained in almost quantitative yield produces purified benzenes having boiling points of from 165–220° C. and a specific gravity of 0.8974 which when treated with sulphuric acid warms up only insignificantly and when shaken up with this acid shows only a yellowish color. The residue of the distillation is obtained as a yellowish resin in a quantity of about 10%.

The comparison of the boiling points of the crude heavy benzenes obtained by high temperature coking of mineral coal and of the hydrogenated heavy benzenes shows conclusively that no cracking has taken place.

| Crude | | Hydrogenated | |
|---|---|---|---|
| 181–182.5° C. | = 5% | 165–172° C. | = 5% |
| 181–183.2 | =10% | 165–174.5 | =10% |
| 181–184 | =20% | 165–180 | =20% |
| 181–184.5 | =30% | 165–182.5 | =35% |
| 181–185 | =40% | 165–183.5 | =40% |
| 181–186 | =50% | 165–185.5 | =50% |
| 181–187 | =60% | 165–188.5 | =60% |
| 181–188.5 | =70% | 165–192 | =70% |
| 181–191 | =80% | 165–201 | =80% |
| 181–196.5 | =90% | 165–220 | =85% |

What I claim is:—

Process for the production of motor spirit consisting in mixing in an autoclave 500 kg. of a crude benzine obtained by the low temperature coking of long flaming gas coal with 100 kg. of finely divided active carbon, in heating said mixture in an autoclave for 3 hours at about 350° C. in an atmosphere of hydrogen at a pressure of 110 atmospheres, and in steam blowing the contents of the autoclave.

In testimony whereof I have signed my name to this specification.

HANS KAFFER.